(12) United States Patent
Liu et al.

(10) Patent No.: US 8,921,464 B2
(45) Date of Patent: Dec. 30, 2014

(54) ADHESIVE COMPOSITIONS AND USE THEREOF

(71) Applicant: Henkel Corporation, Rocky Hill, CT (US)

(72) Inventors: Yayun Liu, Franklin Park, NJ (US);
Charles W. Paul, Madison, NJ (US);
Allison Xiao, Belle Mead, NJ (US);
Andrea Eodice, Hillsborough, NJ (US)

(73) Assignee: Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/785,296

(22) Filed: Mar. 5, 2013

(65) Prior Publication Data

US 2013/0184384 A1 Jul. 18, 2013

Related U.S. Application Data

(63) Continuation of application No. PCT/US2011/061578, filed on Nov. 21, 2011.

(60) Provisional application No. 61/415,514, filed on Nov. 19, 2010.

(51) Int. Cl.
| | |
|---|---|
| *C09J 131/04* | (2006.01) |
| *C09J 123/08* | (2006.01) |
| *C09J 133/08* | (2006.01) |
| *C09J 191/06* | (2006.01) |
| *C09J 11/06* | (2006.01) |
| *C09J 11/08* | (2006.01) |
| *C08K 5/151* | (2006.01) |
| *C08K 5/053* | (2006.01) |

(52) U.S. Cl.
CPC .................. *C09J 11/06* (2013.01); *C09J 11/08* (2013.01)*C09J 123/0815* (2013.01); *C09J 123/0853* ; (2013.01); *C08K 5/151* (2013.01); *C08K 5/053* (2013.01)
USPC ............ 524/100; 524/394; 524/560; 524/563

(58) Field of Classification Search
CPC .......... C09J 11/00; C09J 11/06; C09J 131/04; C09J 123/0853; C09J 123/0869; C09J 191/06; C09J 191/08
USPC ....................................................... 524/394
See application file for complete search history.

(56) References Cited

U.S. PATENT DOCUMENTS

| | | | | |
|---|---|---|---|---|
| 4,743,238 | A | * | 5/1988 | Colon et al. .................. 604/361 |
| 6,300,398 | B1 | | 10/2001 | Jialanella et al. |
| 2005/0042469 | A1 | | 2/2005 | Gong et al. |
| 2007/0160833 | A1 | | 7/2007 | Maak et al. |
| 2008/0017310 | A1 | | 1/2008 | Grawe et al. |
| 2009/0203847 | A1 | | 8/2009 | Ellis et al. |

FOREIGN PATENT DOCUMENTS

| | | |
|---|---|---|
| WO | 2010109018 A1 | 9/2010 |
| WO | 2012013699 A1 | 2/2012 |

* cited by examiner

*Primary Examiner* — Vu A Nguyen
(74) *Attorney, Agent, or Firm* — Sun Hee Lehmann

(57) ABSTRACT

The invention provides hot melt adhesives that comprise a templating agent, a polymer and a wax. It has been discovered that hot melt adhesives with an effective amount of templating agent have improved heat resistance than adhesives. The adhesives find particular use as case, carton, and tray forming, and as sealing adhesives, including heat sealing applications, for example in the packaging of cereals, cracker and beer products.

20 Claims, 3 Drawing Sheets

ADHESIVE COMPOSITIONS AND USE THEREOF

FIELD OF THE INVENTION

The present invention relates to hot melt adhesive compositions that comprise a templating agent. More particularly the invention relates to hot melt adhesives that have increased heat resistance, making these adhesives particularly well suited for assembly and packaging applications.

BACKGROUND OF THE INVENTION

Adhesives are applied to a substrate and are widely used for various commercial and industrial applications such as product assembly and packaging.

Hot melt adhesives are widely used in the packaging industry to seal cardboard cases, trays and cartons. Some applications require hot melt adhesive with high heat resistance (ability to maintain fiber tear at high temperature) and sufficient strength so that sealed container will not pop open at 125° F.

Hot melt adhesives for assembly and packaging are typically composed of a polymer, a tackifier and a wax. Each component provides a specific function: the base polymer provides cohesive strength and elasticity; the tackifier provides wetting, tack and viscoelastic properties; and the wax helps to moderate viscosity, control setting speed and improve bond strength and temperature resistance.

In recent years, demand for waxes has grown in hot melt adhesive applications and in other fields of applications. With rising crude oil prices, refineries increasingly produce more gasoline and feedstock than highly refined wax, because gasoline and feedstock have higher monetary value and manufacturing efficiency. Instead, refineries tend to produce larger quantities of less refined waxes, which have more oil content and higher levels of contaminants than the highly refined waxes. Use of these less refined waxes in hot melt adhesives decreases the overall performance of the adhesive.

There is a need in the art for a hot melt adhesive that possesses good performances such as high heat resistances that can be prepared with less refined waxes. The current invention fulfills this need.

BRIEF SUMMARY OF THE INVENTION

The invention provides hot melt adhesives that comprise a templating agent.

Templating agents have been used in the past for adhesive applications, in large quantities, to form uniform and small crystals in the adhesive. The small crystals improved elongation or ductility of the adhesive but failed to improve the heat stress of the adhesive. Surprisingly, the use of the templating agent at a range of about 0.01 to less than about 0.5 wt % increases the size of the wax crystals in the adhesive. The increase in crystal size improves the heat resistance of the adhesive, and effectively increased the heat resistance by at least 5° F.

In one embodiment, the adhesives comprise (1) a crystalline or a semi-crystalline polymer component, (2) a wax, and (3) from about 0.01 wt % to less than 0.5 wt % of a templating agent, based on the total weight of the adhesive. The heat of enthalpy (ΔH) of the adhesive is increased by at least 5% over an adhesive composition without the templating agent; the average crystal size in the adhesive is increased by at least 10% over the adhesive composition without the templating agent; and the heat resistance of the adhesive is increased by at least 5° F. over the adhesive composition without the templating agent.

Another aspect of the invention is directed to an adhesive with a templating agent with the following structure of:

Ar-L1-X-L2-R wherein X is a sugar or a sugar alcohol;

Ar is a substituted or unsubstituted aryl-containing functional group;

R is H, alkyl, alkenyl, hydroxyl, alkoxy and alkyl-halide, or a substituted or unsubstituted aryl-containing functional group; and L1 and L2, independently, are acetal or ether functional groups.

Yet another aspect of the invention is directed to adhesives with a templating agent that is a fatty acid or fatty acid salt; phenyl esters; aliphatic amines; perfluoroalkanes; n-alkaneamides; arylamides; mono, di, tris and polyamides; ammonium and phosphonium salts; amino acid derivatives; peptides; urea and thiourea derivatives; urethanes; ureidopyrimidones; and aminopyrimidones and the corresponding derivatives.

In a further aspect, the hot melt adhesives further comprises a tackifier, a stabilizer, a plasticizer and/or an additive.

Another aspect is directed to a process for forming adhesives with increased ΔH and increased average crystal size which comprises heating a first component to a molten state, adding a templating agent into the molten polymer until a homogenous first mixture is formed, adding a second component to the first mixture to form a second mixture; and cooling the second mixture to room temperature. Both he first and the second components are a wax or a polymer, the first component has a lower crystallization temperature than that of the second component and the second component is the remaining wax or polymer component. The cooled adhesive can be pelletized or formed into blocks for storage or shipping. The adhesive can be reheated to apply onto substrates.

A further aspect is directed to a process for forming adhesives with increased ΔH and increased average crystal size which comprises heating a first component to a molten state, adding a templating agent into the molten state until a homogenous first mixture is formed, adding a second component to the first mixture to form a second mixture; adding a third component to form a third mixture, and cooling the third mixture to room temperature. The cooled adhesive can be pelletized or formed into blocks for storage or shipping. The three components are either a wax, a polymer or a tackifier. The templating agent has the highest solubility in the first component. Of the remaining two components, the second component has a lower crystallization temperature than that of the third component, and the third component is the remaining component.

Yet another aspect is directed to the three component process as outlined above, but with different method of choosing the three components. The first component has the lowest melting temperature. Of the remaining two components, the second component has a lower crystallization temperature than the third component.

Yet another aspect of the invention is directed to articles of manufacture comprising the adhesives described herein. Articles of manufacture encompassed by the invention include cases, cartons and trays.

DETAILED DESCRIPTION OF THE INVENTION

Figure 1:
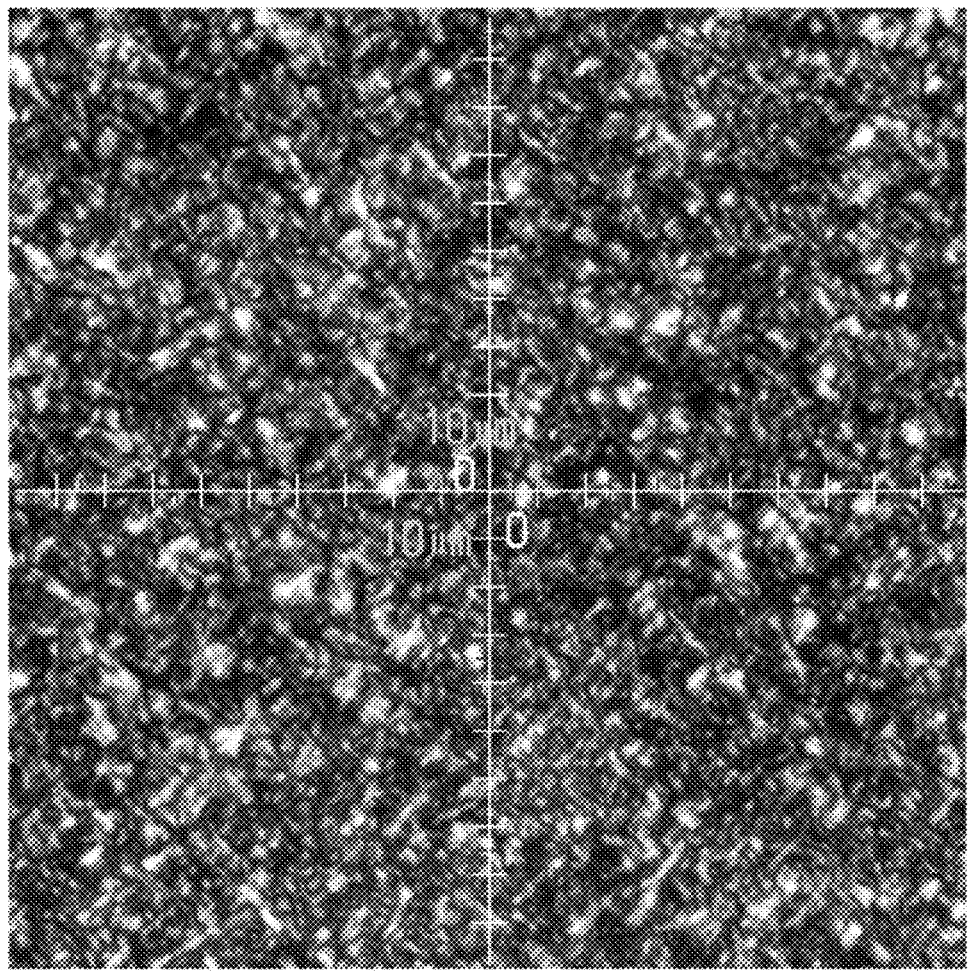
FIGS. 1-3 are 20× magnified microscopic photograph of crystals in adhesive formulations.

Percent by weight means, unless expressly stated otherwise, percent dry weight based on the total weight of the adhesive.

It has been discovered that hot melt adhesives with high heat resistance can be obtained using at least one templating agent. The adhesives of the invention have larger crystal size and increased heat stress than adhesives without the templating agent.

The invention provides hot melt adhesives that comprise (i) a polymer component and (ii) a wax and (iii) an effective amount of a templating agent. An effective amount of a templating agent in a hot melt adhesive increases the ΔH of the adhesive by at least 5% over an adhesive composition without the templating agent; and the average crystal size in the adhesive increases by at least 10% over the adhesive composition without the templating agent. Depending upon the choice of the templating agent, the effective amount varies from about 0.01 wt % to less than about 0.5 wt %, based on the total weight of the adhesive.

The adhesives of the invention will preferably comprise at least one ethylene polymer, and may comprise a blend of two or more polymers. The term ethylene copolymer, as used herein, refers to homopolymers, copolymers and terpolymers of ethylene. The ethylene polymer is crystalline or semi-crystalline polymer. The term semi-crystalline polymer includes polymers that contain both crystalline and amorphous regions, but not completely amorphous polymers.

Examples of ethylene copolymers include copolymers with one or more polar monomers that can copolymerize with ethylene, such as vinyl acetate, maleic anhydride or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene 2-ethyl hexyl acrylate, ethylene acrylic acid, ethylene methacrylate and mixtures and blends thereof. Other examples include but are not limited to recycled polyethylene terphthalate and polyethylene, ethylene/a-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). Random and block copolymers, as well as blends thereof may be used in the practice of the invention.

Preferred adhesives for use in the practice of the invention will also comprise from about 5 to about 40 wt % of at least one ethylene vinyl acetate polymer having a MI (Melt Index) of at least about 750 grams/10 minutes, preferably a MI of 900 grams/10 minutes, and having a vinyl acetate content of from about 20 to about 35% by weight. Ethylene vinyl acetate copolymers are available from DuPont Chemical Co., Wilmington, Del. under the trade name ELVAX® (e.g., ELVAX® 205W which has a melt index of 800 and a vinyl acetate content of about 28% by weight in the copolymer and ELVAX® 410 which has a melt index of 500 and a vinyl acetate content of about 18% by weight in the copolymer). Other ethylene vinyl acetate copolymers are available from Exxon Chemical Co. under the trade name ESCORENE® (e.g., UL 7505, 7710, 7740 and 8705) and also from Millennium Petrochemicals, Rolling Meadows, Ill., under the trade name ULTRATHENE® (e.g., UE 64904) and AT® copolymers available from AT Polymers & Film Co., Charlotte, N.C. (e.g., AT® 1850M) and EVATANE® from Atofina Chemicals, Philadelphia, Pa.

The adhesives of the invention may also comprise an ethylene n-butyl acrylate copolymer having a MI of at least about 750 grams/10 minutes, preferably a MI of 900 grams/10 minutes, and having a n-butyl acrylate content of from about 30 to about 40 wt %. Ethylene n-butyl acrylate copolymers are available from Atofina Chemical, Philadelphia, Pa. as LOTRYL®BA, from Exxon Chemical Co. as ENABLE® (e.g., EN33330 which has a melt index of about 330 grams/10 minutes and an n-butyl acrylate content of about 33% by weight in the copolymer and EN33900 which has a melt index of about 900 and an n-butyl acrylate content of about 35% by weight) and from Millennium Petrochemicals under as ENATHENE® (e.g., EA 89822 which has a melt index of about 400 grams/10 minutes and a n-butyl acrylate content of about 35% by weight in the copolymer).

Ethylene methyl acrylate copolymers are also useful and are available from Exxon Chemical Co. as OPTEMA® (e.g., OPTEMA® XS 93.04 which has a melt index of about 270 grams/10 minutes and a methyl acrylate content of about 20% by weight in the copolymer). Other useful polymers include amorphous poly-a-olefin polymers from Rexene Products Co. in Dallas, Tex. under the trade name REXTAC®, from Creanova under the trade name VESTOPLAST®, EXACT® 5008, an ethylene-butene polymer; EXXPOL® SLP-0394, an ethylene-propylene polymer; EXACT® 3031, an ethylene-hexene polymer all available from Exxon Chemical Co.; and INSIGHT® SM-8400, an ethylene-octene polymer available from Dow Chemical Co. Midland, Mich. Ethylene methyl acrylate polymers containing from about 10 to about 28 weight % by weight methyl acrylate and ethylene acrylic acid copolymers having acid numbers of 25 to 150 may also be used in the practice of the invention.

In another embodiment, the polymer contains a mixture of degraded copolymer of (1) elastomeric rubbers or elastomeric rubbers selected from ethylene-propylene rubbers and ethylene-propylene-diene monomer terpolymer rubbers and (2) a semi-crystalline olefinic polymers or a blend of semi-crystalline olefinic polymers, as described in EP09163374.3 and EP09163380.0. In a further embodiment, the polymer contains a degraded polypropylene copolymer, as described in DE102010038488.7 and EP10176813.3.

The polymer component will usually be present in an amount of from about 10 wt % to about 50 wt %, more preferably from about 20 wt % to about 45 wt %, even more preferably from about 30 wt % to about 42 wt %.

Preferred embodiments will comprise ethylene vinyl acetate, ethylene n-butyl acrylate or blends thereof.

The adhesives also comprise a wax component.

Waxes suitable for use in the present invention include petroleum based waxes, synthetic waxes and naturally occurring waxes such as animal and plant waxes.

Exemplary petroleum based waxes include paraffin waxes and microcrystalline waxes. Exemplary synthetic waxes include polyethylene waxes, polypropylene waxes, poly-α-olefin waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology "synthetic high melting point waxes" to include high density low molecular weight polyethylene waxes, by-product polyethylene waxes and Fischer-Tropsch waxes.

Paraffin waxes that can be used in the practice of the invention include OKERIN® 236 TP available from Astor Wax Corporation, Doraville, Ga.; PENRECO® 4913 available from Pennzoil Products Co., Houston, Tex.; R-7152 Paraffin Wax available from Moore & Munger, Shelton, Conn.; and Paraffin Wax 1297 available from International Waxes, Ltd. in Ontario, Canada, Parvan 1471, 1580 available from Exxon Mobil, Fairfax, Va., and R-2540 available from Moore and Munger; and other paraffinic waxes such as those available from CP Hall under the product designations 1230, 1236, 1240, 1245, 1246, 1255, 1260, & 1262. CP Hall 1246 paraffinic wax is available from CP Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include VICTORY® Amber Wax, a 70° C. melting point wax available from Petrolite Corp. located in Tulsa, Okla.; BARECO® ES-796 Amber Wax, a 70° C. melt point wax available from Bareco in Chicago, Ill.; OKERIN® 177, an 80° C. melt point wax available from Astor Wax Corp.; BESQUARE® 175 and 195 Amber Waxes and 80° C. and 90° C. melt point microcrystalline waxes both available from Petrolite Corp. in Tulsa, Okla.; INDRAMIC® 91, a 90° C. melt point wax available from Industrial Raw Materials located in Smethport, Pa.; and PETROWAX® 9508 Light, a 90° C. melt point wax available from Petrowax Pa., Inc. located in New York, N.Y.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm$^3$, and a melting point of approximately 126° C. A useful polyethylene waxes for use in the practice of the invention are Marcus IA300; Honeywell AC-8, AC-9 and AC-1833 and Innospec Leuna GmbH Viscowax 100 and 111V.

Fischer-Tropsch waxes (including, e.g., oxidized Fischer-Tropsch waxes, and the like) for use in the practice of the invention will have a melting point of from about 60° C. to about 80° C. Fischer-Tropsch waxes having a melting point about 71° C. are particularly preferred. Fischer-Tropsch waxes that can be used in the practice of the invention are commercially available from Equillon under the trade name Calista SM158 and IGI 1339A from International Groups, Inc. Fischer-Tropsch waxes for use in conventional (application temperature up to 350° F.) hot melt adhesives include Paraflint H1 form Sasol, and Bareco PX-105 from Baker Petrolite.

Waxes will typically be present in the formulations of the invention in amounts of from about 5 to about 60 wt %, more preferable from about 10 to about 45 wt %, and even more preferable from about 15 to about 35 wt %. Preferred waxes have a melt temperature between 120° F. and 250° F., more preferably between 150° F. and 230° F., and most preferable between 180° F. and 220° F.

To form adhesives with homogenous and sharp melting point, highly refined waxes are desired. Less refined waxes have greater oil content and have more contaminants. Thus, the hot melt adhesives prepared with less refined waxes have wider melting ranges and have lower heat stress values. Surprisingly, adhesives prepared with an effective amount of a templating agent, even with less refined waxes have improved heat stress. While not bound by any particular theory, it is believed that the templating agents form nanofibrillar networks in hydrocarbon or organic solvent, and induce network formation, which affects the adhesive rheological and mechanical properties.

One suitable class of templating agents includes sugar or sugar alcohols that has a structure of:

Ar-L1-X-L2-R wherein X is a sugar or a sugar alcohol;
Ar is a substituted or unsubstituted aryl-containing functional group;
R is H, alkyl, alkenyl, hydroxyl, alkoxy and alkyl-halide, or a substituted or unsubstituted aryl containing functional group; and
L1 and L2, independently, are acetal or ether functional groups.

The sugar or sugar alcohol may be selected from allose, altrose, fructose, galactose, glucose, gulose, idose, mannose, sorbose, talose, tagatose, arabinose, ribose, ribulose, xylose, xylulose, lyxose, erythrose, threose sorbitol or xylitol.

Preferred sugars or sugar alcohols derivatives include 1,3: 2,4 dibenzylidene sorbitol, 1,3: 2,4 (4-methyldibenzylidene) sorbitol, bis(3,4 dimethylbenzylidene) sorbitol, bis(4-propylbenzylidene) propylsorbitol, and the like.

Another suitable class of templating agents is fatty acids and fatty acid salts. Preferred fatty acids and fatty acid salts include Li-12 OH stearate, Al stearate, Mg stearate, Ca stearate, 12-hydroxy stearic acid and the like.

Also suitable templating agents include phenyl esters, aliphatic amines, perfluoroalkanes, ammonium and phosphonium salts, such as tera-n-octadecylammonium salts; amino acid derivatives; peptides, such as linear and cyclopeptides; urea and thiourea derivatives, such as N-phenyl-N'-(alkoxycarbonyl)phenyl ureas; urethanes, such as pyrenic urethanes, urethane derivatives of L-alanine and L-phenylalanine.

Also suitable as templating agents include n-alkaneamides, arylamides; mono, di, tris and polyamides and their derivatives. Examples include triamino benzene derivatives such as Irgaclear XT 386, N,N',N"-Tris(2-methylcyclohexyl)-1,2,3-propanetricarboxamide available as RiKA-CLEAR PC1, N,N'-dicyclohexyl-2,6-naphthalenendicarboxamide available as NJSTAR NU-100, and the like.

Yet another suitable templating agent includes ureido-pyrimidone and aminopyrimidone and their derivatives. Examples of ureido-pyrimidone and its derivatives include 3-[5-(6-ethoxy-5-oxohexyl)-4-oxo-6-phenyl-1,4-dihydropyrimidin-2-yl]-1-{2-[3-(prop-1-en-2-yl)phenyl]propan-2-yl}urea, ethyl 6-{2-({2-[(2-methylprop-2-enoyl)oxy]ethyl}carbamoyl)amino]-4-oxo-6-phenyl-1,4-dihydropyrimidin-5-yl}hexanoate, ethyl 6-(2-{[(2-ethoxy-2-oxoethyl)carbamoyl]amino}-4-oxo-6-phenyl-1,4-dihydropyrimidin-5-yl)hexanoate, {[(6-{[(5-"R1"-6-"R2"-4-oxo-1,4-dihydropyrimidin-2-yl) carbamoyl]amino}hexyl) carbamoyl]oxy}"Pn"yl N-(6-{[(5-"R1"-6-"R2"-4-oxo-1,4-dihydropyrimidin-2-yl)carbamoyl]amino}hexyl)carbamate, 3-(6-heptyl-5-hexyl-4-oxo-1,4-dihydropyrimidin-2-yl)-1-{2-[3-(prop-1-en-2-yl)phenyl]propan-2-yl}urea, ethyl 6-[2-({[20-({[5-(6-ethoxy-6-oxohexyl)-4-oxo-6-phenyl-1,4-dihydropyrimidin-2-yl]carbamoyl}amino)-10,11-dioctylicosyl]carbamoyl}amino)-4-oxo-6-phenyl-1,4-dihydropyrimidin-5-yl]hexanoate, and the like. Examples of aminopyrimidone and its derivatives include ethyl 3-(2-amino-6-methyl-4-oxo-1,4-dihydropyrimidin-5-yl)propanoate, Alkyl-functional 2-amino-6-heptyl-5-hexyl-1,4-dihydropyrimidin-4-one, Ester-functional ethyl 6-(2-amino-4-oxo-6-phenyl-1,4-dihydropyrimidin-5-yl)hexanoate, Ether-functional 2-amino-5-[2-(2-methoxyethoxy)ethyl]-6-phenyl-1,4-dihydropyrimidin-4-one, ethyl 3-{2-[("R"carbonyl)amino]-6-methyl-4-oxo-1,4-dihydropyrimidin-5-yl}propanoate, 3-{[5-(6-ethoxy-6-oxohexyl)-4-oxo-6-phenyl-1,4-dihydropyrimidin-2-yl]

carbamoyl}-2-methylpropanoic acid, ethyl 3-[6-methyl-4-oxo-2-(3-oxobutanamido)-1,4-dihydropyrimidin-5-yl]propanoate, ethyl 3-{2-[(2Z)-but-2-enamido]-6-methyl-4-oxo-1,4-dihydropyrimidin-5-yl}propanoate, ethyl 3-[2-(3-hydroxybutanamido)-6-methyl-4-oxo-1,4-dihydropyrimidin-5-yl]propanoate, and the like.

Depending upon the templating agent and the adhesive formulation (e.g., polymer and wax), the effective amount varies from about 0.01 wt % to less than about 0.5 wt %, based on the total weight of the adhesive. For formulations that include sorbitol and its derivatives, ranges of about 0.05 to less than about 0.5 wt % is preferred. For formulations that include fatty acids and fatty acid salts and their corresponding derivatives, ranges of about 0.05 to about 0.35 wt % is preferred. Generally, it is desirable to include higher amounts of the templating agent in the adhesive formulation as the solubility of the templating agent increases in the adhesive. Not withstanding the above, greater amount of the templating agent may be used depending on the solubility of the templating agent in the adhesive formulation.

The adhesives of the invention will also comprise a tackifier. The tackifier component will usually be present in an amount of from about 10 wt % to about 60 wt %, more preferably from about 20 wt % to about 50 wt %, even more preferably from about 20 wt % to about 40 wt %. The tackifying resins typically will have Ring and Ball softening points, as determined by ASTM method E28, between about 70° C. and 150° C., more preferably between about 90° C. and 135° C., and most preferably between about 95° C. and 130° C.

Useful tackifying resins include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Also included are the cyclic or acyclic $C_5$ resins and aromatic modified acyclic or cyclic resins. Examples of commercially available rosins and rosin derivatives that could be used to practice the invention include SYLVALITE RE 100L, 110L, SYLVARES RE 115, and SYLVARES RE 104 available from Arizona Chemical; Dertocal 140 from DRT; Limed Rosin No. 1,GB-120, and Pencel C from Arakawa Chemical. Examples of commercially available phenolic modified terpene resins are Sylvares TP 2040 HM and Sylvares TP 300, both available from Arizona Chemical.

Preferred tackifiers are synthetic hydrocarbon resins. Included are aliphatic or cycloaliphatic hydrocarbons, aromatic hydrocarbons, aromatically modified aliphatic or cycloaliphatic hydrocarbons and mixtures thereof.

Non-limiting examples include aliphatic olefin derived resins such as those available from Goodyear under the WINGTACK® Extra trade name and the ESCOREZ® 1300 series from Exxon. A common $C_5$ tackifying resin in this class is a diene-olefin copolymer of piperylene and 2-methyl-2-butene having a softening point of about 95° C. This resin is available commercially under the trade name Wingtack 95. Also useful are $C_9$ aromatic/aliphatic olefin-derived resins available from Exxon in the Escorez 2000 series. Hydrogenated hydrocarbon resins are especially useful. These hydrogenated resins include Escorez 5000 series of hydrogenated cycloaliphatic resins from Exxon, hydrogenated $C_9$ and/or $C_5$ resins such as ARKON® P70, P90, P115, P125 available from Arakawa Chemical, hydrogenated aromatic hydrocarbon resins such as REGALREZ® 1018, 1085 and the REGALITE® R series of resins from Hercules Specialty Chemicals. Other useful resins include hydrogenated polyterpenes such as CLEARON® P-105, P-115 and P-125 from the Yasuhara Yushi Kogyo Company of Japan. Mixtures of such tackifying agents may also be used.

Eastotac series from Eastman are also useful in the invention. Examples include Eastotac 100, 115, and 130 series of tackifiers.

Also useful are aromatic hydrocarbon resins that are $C_9$ aromatic/aliphatic olefin-derived and available from Sartomer and Cray Valley under the trade name Norsolene and from Rutgers series of TK aromatic hydrocarbon resins. Norsolene M1090 is a low molecular weight thermoplastic hydrocarbon polymer having a Ring and Ball softening point of 95-105° C. and is commercially available from Cray Valley.

Alpha methyl styrene such as Kristalex 3085 and 3100 from Eastman Chemicals, Sylvares SA 100 from Arizona chemicals are also useful as tackifiers in the invention. Adhesives formulated with such alpha methyl styrenes have resultant viscosity of less than about 1500 cP at 250° F. (121° C.). Mixtures of two or more described tackifying resins may be required for some formulations.

Small quantities of alkyl phenolic tackifiers can be blended with additional tackifier agents detailed above to improve the high temperature performance of these adhesives. Alkyl phenolics added in less than 20 wt % of the total weight of the adhesive are compatible and in the proper combination increase high temperature adhesive performance. Alkyl phenolics are commercially available from Arakawa Chemical under the Tamanol trade name and in several product lines from Schenectady International.

The adhesives of the present invention may also contain a conventional stabilizer or antioxidant. These compounds are added to protect the adhesive from degradation caused by reaction with oxygen induced by heat, light, or residual catalyst from the raw materials such as the tackifying resin. These compounds are added to the hot melts in small amounts and have no effect on other physical properties.

An antioxidant or stabilizer may also be included in the adhesive compositions described herein in amounts of up to about 3% by weight, more typically in amounts of about 0.5% based on the total weight of the adhesive. Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba-Geigy, Hawthorne, N.Y. and include IRGANOX® 565, 1010 and 1076 which are hindered phenols. These are primary antioxidants which act as radical scavengers and may be used alone or in combination with other antioxidants such as phosphite antioxidants like IRGAFOSIrgafos® 168 available from Ciba-Geigy. Other antioxidants include ETHANOX 330, a hindered phenol from Albermarle; SANTOVAR, a 2,5 ditert-amyl hydroquinone from Monsanto; and Navagard P a tris (p-nonylphenyl)phosphate from Uniroyal.

The adhesives of the present invention may desirably also contain a plasticizer, including oil. Suitable plasticizers include polybutenes, phthalates benzoates, adipic esters and the like. Particularly preferred plasticizers include phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils and derivatives. Preferred plasticizers include paraffinic oil, naphthenic oil, aromatic oil, long chain partial ether ester, alkyl monoesters, epoxidized oils, dialkyl diesters, aromatic diesters, alkyl ether monoester and mixtures thereof.

In other embodiments the oil, is typically present at about 1 to about 30 wt %, based upon the total weight of the adhesive, more preferably 5 to 20 wt %, based on the total weight of the adhesive. In some embodiments, however, oils may not be desired and is present at less than 5 wt %, preferably less than 3 wt %, more preferably less than 1 wt %, more preferably less than 0.5 wt % or even essentially free of oil, based upon the total weight of the adhesive.

Depending on the contemplated end uses of the adhesives, other additives such as pigments, dyestuffs, fluorescing agents and fillers conventionally added to hot melt adhesives may be incorporated in minor amounts, i.e., up to about 10% by weight, into the formulations of the present invention. Additives like these are known to those skilled in the art.

The adhesive compositions of the present invention are prepared by blending the components in the melt at a temperature of above about 250° F., typically at about 300° F. until a homogeneous blend is obtained. Various methods of blending are known in the art and any method that produces a homogeneous blend is satisfactory.

The adhesives may desirably be formulated for conventional and low temperatures application, i.e., formulations that can be applied at temperatures at about 350° F. and down to about 200° F. They provide superior adhesive bonds even when exposed to a wide variety of temperature conditions. The adhesives possess excellent heat resistance.

The hot melt adhesives of the invention find use in, for example, packaging, converting, bookbinding, bag ending and in nonwovens articles. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like.

The substrates to be bonded include virgin and recycled kraft, high and low density kraft, chipboard and various types of treated and coated kraft and chipboard. Composite materials are also used for packaging applications. These composite materials may include chipboard laminated to an aluminum foil that is further laminated to film materials such as polyethylene, Mylar, polypropylene, polyvinylidene chloride, ethylene vinyl acetate and various other types of films. Additionally, these film materials also may be bonded directly to chipboard or Kraft. The aforementioned substrates by no means represent an exhaustive list, as a tremendous variety of substrates, especially composite materials, find utility in the packaging industry.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLE

Example 1

Paraffin Wax

Three comparative adhesive samples (Comp 1, Comp 1a and Comp 2) and four adhesive samples (Samples A-D) are listed in Table 1. Each sample is listed with the percent of the templating agent (% TA). The wax, tackifier and anti-oxidant were heated at 250° F. until they were dissolved into a homogenous mixture. The templating agent was then added at 400° F. and was mixed until dissolved. The polymer was then added at 250° F. and mixed until dissolved.

Heat stress is defined as being the temperature at which a stressed bond fails. Heat stress was measured by forming a composite construction of adhesive (2×½" compressed) between two pieces of corrugated paperboard of specific dimensions. Tests were done in triplicate. The adhesive bead forming this composite is then placed under approximately 100 grams of cantilever stress for 24 hours at 130° F. to 150° F. The test results were recorded as pass (both bonds passed (P)), fail (both bonds failed (F)).

TABLE 1

| | Adhesive Formulations | | | | | | |
|---|---|---|---|---|---|---|---|
| (% TA) | Comp 1 (0) | Sample A (0.25) | Sample B (0.49) | Comp 1a (0.65) | Comp 2 (0) | Sample C (0.25) | Sample D (0.49) |
| Parvan 1471[a] | 30 | 30 | 30 | 30 | — | — | — |
| Parvan 1580[b] | — | — | — | — | 30 | 30 | 30 |

TABLE 1-continued

Adhesive Formulations

| (% TA) | Comp 1 (0) | Sample A (0.25) | Sample B (0.49) | Comp 1a (0.65) | Comp 2 (0) | Sample C (0.25) | Sample D (0.49) |
|---|---|---|---|---|---|---|---|
| Sylvalite RE 110L[c] | 5 | 5 | 5 | 5 | 5 | 5 | 5 |
| Kristalex 3100[d] | 10 | 10 | 10 | 10 | 10 | 10 | 10 |
| Novares TK110H[e] | 10 | 10 | 10 | 10 | 10 | 10 | 10 |
| Norsolene A110[f] | 10 | 10 | 10 | 10 | 10 | 10 | 10 |
| Millithix 925S[g] | 0 | 0.25 | 0.50 | 0.65 | | 0.25 | 0.50 |
| UL 8705[h] | 35 | 35 | 35 | 35 | 35 | 35 | 35 |
| Total weight | 100 | 100.25 | 100.50 | 100.65 | 100 | 100.25 | 100.50 |
| Heat Stress Test at 130° F. | 2F | 2F | 3P | 2F | 2F | 2F | 3P |
| Heat Stress Test at 135° F. | | | 3P | 2F | | | |

[a]paraffin wax from Exxon Mobil
[b]paraffin wax from Exxon Mobil
[c]rosin ester from Arizona Chemical
[d]alpha methyl styrene tackifier from Eastman Chemical
[e]hydrocarbon tackifier from Rutgers
[f]hydrocarbon tackifier from Cray Valley
[g]1,3: ,2,4 dibenzylidene sorbitol from Milliken
[h]EVA polymer from Exxon Mobil Table 1 indicated that templating agent can improve the heat stress performance of adhesives when used in an effective amount. At templating agent concentration of 0.49 wt %, the adhesive passed heat stress test at 130° F. (also at 135° F. for Sample D). However, when the concentration increased to 0.65 wt % (Comp 1a), the improved heat resistance was not realized.

The above adhesive samples were evaluated in the Q100 modulated DSC (TA instrument). The samples were first heated from 25° C. to 250° C. at a rate of 10 C/min, held at isothermal for three (3) minutes, and then cooled to −40° C. at a rate of 40°/min. The initial melting peak was calculated to obtain ΔH value. As shown in Table 2, increasing the amount of templating agent in the adhesive increased the heat of enthalpy for the melting process. However, merely increasing the templating agent greater than 0.5 wt %, based on the total weight of the adhesive, fails to further increase the melt enthalpy.

TABLE 2

DSC Evaluations

| | Peak (° C.) | Onset (° C.) | ΔH (J/g) |
|---|---|---|---|
| Comparative 1 (Figure 1) | 68.7 | 63.4 | 81.9 |
| Sample A | 68.5 | 63.9 | 85.8 |
| Sample B (Figure 2) | 69.1 | 67.7 | 89.2 |
| Comparative 1a (Figure 3) | 68.4 | 64.3 | 86.2 |

Figure 2:
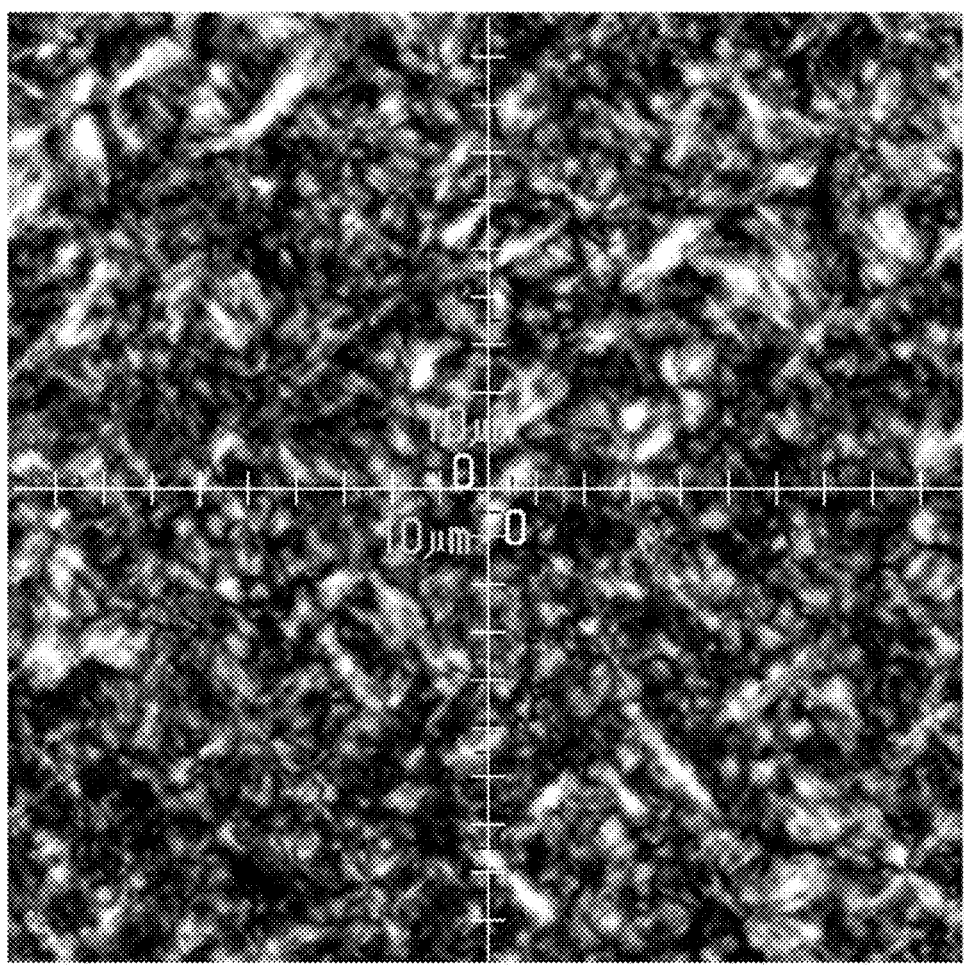
Figure 3:
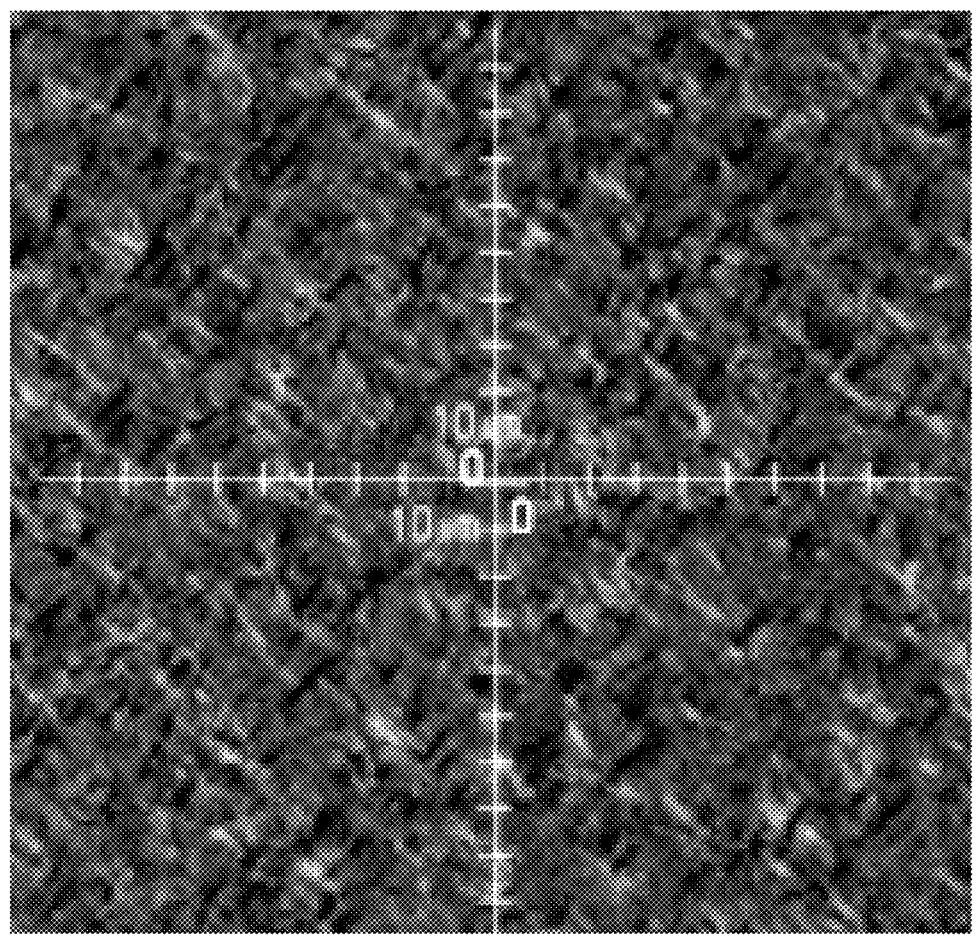

FIGS. 1, 2 and 3 are cross-section microscopic photographs with 20× magnification of Comparative 1, Sample B and Comparative 1a, respectively. With the addition of a templating agent, there is a larger population of crystals with size greater than about 20 microns (FIG. 2) than without any templating agent (FIG. 1). However, adhesive formulation with templating agent greater than 0.5 wt % resulted in smaller crystalline domains (FIG. 3).

Thus both DSC evaluations and microscopy analysis indicated that adhesives prepared with the effective amount of templating agents resulted in higher amounts of crystals and larger crystal sizes than adhesive prepared with templating agents outside the effective amount.

Example 2

Polyethylene Wax

Comparative Sample 3 (Comp 3) and samples E and F were prepared in the same manner as the adhesives in Table 1. The components of the adhesives are listed in Table 3.

TABLE 3

Adhesive Formulations

| | (% TA) | | |
|---|---|---|---|
| | Comp 3 (0) | Sample E (0.15) | Sample F (0.25) |
| Marcus IA300[i] | 24.0 | 24.0 | 24.0 |
| Sylvalite RE100L[c] | 57.6 | 57.6 | 57.6 |
| Irganox 1010FF[j] | 0.3 | 0.3 | 0.3 |
| Irgafos 168[j] | 0.3 | 0.3 | 0.3 |
| Li-12OH stearate[k] | 0 | 0.18 | 0.3 |
| UL7740[l] | 11.4 | 11.4 | 11.4 |
| UL7710[l] | 26.4 | 26.4 | 26.4 |
| Total weight | 120.00 | 120.18 | 120.30 |
| Heat Stress Test at 125° F. | 3P | 3P | 2P1F |
| Heat Stress Test at 130° F. | 1P2F | 2P1F | 1P2F |

[i]polyethylene wax from Marcus Oil and Chemical
[c]rosin ester from Arizona Chemical
[j]anti-oxidants from Ciba
[k]templating agent from H. L. Blachford LTD
[l]EVA polymers from ExxonMobil In Example 2, the use of 0.15% Li-12OH stearate (Sample E) improved the adhesive's heat stress performance over the adhesive without any templating agent (Comp 3). Moreover, adhesive with Li-12OH stearate templating agent at 0.25 wt % (Sample F) has a diminished heat stress result. Thus, the heat stress improvement is obtained only when an effective amount of templating agent is used to induce desired morphological and physical property changes. The effective amount of templating agent is dependent on the templating agent and the adhesive formulation (e.g., polymer and wax), but it is typically in the range of about 0.01 wt % to less than 0.5 wt %, based on the total weight of the adhesive.

Example 3

Process Evaluation

The method of making the adhesive with templating agent was evaluated:

Process A: (1) Melt tackifier, antioxidant and either the wax or the polymer (one with the higher onset crystallization temperature component) at 350° F.; (2) add a templating agent at 400° F.; and (3) add the remaining polymer or wax (one with the lower onset crystalline temperature component until homogenous) at 350° F.

Process B: (1) Melt tackifier, antioxidant and either the wax or the polymer (one with the lower onset crystallization temperature component) at 350° F.; (2) add a templating agent 400° F.; and (3) add the remaining polymer or wax (one with the higher onset crystalline temperature component until homogenous) at 350° F.

Process C: (1) Melt wax, tackifier, anti-oxidant and polymer at 350° F.; and (2) add templating agent at 400° F.

Process D: Melt antioxidant with one of three components: wax, polymer or tackifier (wherein the templating agent has the highest solubility in this component over the other two components) at 300° F., (2) add one of the remaining two components (one with the lower crystallization temperature) at 300° F., (3) add the last remaining component in 300° F.

Table 4 lists the adhesive component and the process used to prepare the samples.

TABLE 4

Adhesive Formulations and Process Evaluations

|  | Comp 4 | Sample G | Sample H | Sample I | Sample J |
|---|---|---|---|---|---|
| Process | A | A | B | C | D |
| Marcus IA300 [i] | 24 | 24 | 24 | 24 | 24 |
| UL7740 [l] | 11.4 | 11.4 | 11.4 | 11.4 | 11.4 |
| UL7710 [l] | 26.4 | 26.4 | 26.4 | 26.4 | 26.4 |
| Sylvalite RE100L [c] | 57.6 | 57.6 | 57.6 | 57.6 | 57.6 |
| Irganox 1010FF [j] | 0.3 | 0.3 | 0.3 | 0.3 | 0.3 |
| Irgafos 168 [j] | 0.3 | 0.3 | 0.3 | 0.3 | 0.3 |
| Millithix 925S [g] | 0 | 0.3 | 0.3 | 0.3 | 0.3 |
| Total weight | 120 | 120.30 | 120.30 | 120.30 | 120.30 |
| Heat Stress Test at 125° F. | 2P1F | 2P1F | 3P | 1P2F | 3P |
| Heat Stress Test at 130° F. | 1P2F |  | 2P1F |  | 2P1F |

[i] polyethylene wax from Marcus Oil and Chemical
[l] EVA polymers from ExxonMobil
[c] rosin ester from Arizona Chemical
[j] anti-oxidants from Ciba
[g] 1, 3:, 2, 4 dibenzylidene sorbitol from Milliken The heat stress test results in Table 4 indicated that processes B and D improved heat stress over the control formulation at 125° F. and 130° F.

To correlate the heat stress performance of the adhesive with crystal size, the samples in Table 4 were tested in the DSC for ΔH values in the same manner as the samples in Table 2.

TABLE 5

DSC Evaluations on the process evaluations

|  | Peak (° C.) | Onset (° C.) | ΔH (J/g) |
|---|---|---|---|
| Comp 4 | 111.5 | 89.9 | 44.7 |
| Process A (Sample G) | 111.6 | 91.5 | 49.3 |
| Process B (Sample H) | 115.8 | 91.7 | 54.1 |
| Process C (Sample I) | 111.2 | 91.0 | 47.3 |
| Process D (Sample J) | 113.5 | 91.0 | 51.1 |

The use of processes B and D resulted in larger crystals size and the higher crystalline level, as indicated by the increased exotherm. This also correlates to the better heat stress performance shown in Table 4.

Example 4

Adhesive Preparation at 300° F.

Sample K was prepared in the similar manner as described in Process B, but at 300° F.

TABLE 6

Adhesive Formulation using Process B Prepared at 300° F.

| | (% TA) | |
|---|---|---|
|  | Comp 5 (0) | Sample K (0.25) |
| Marcus IA300 [i] | 24 | 24 |
| UL7740 [l] | 11.4 | 11.4 |
| UL7710 [l] | 26.4 | 26.4 |
| Sylvalite RE100L [c] | 57.6 | 57.6 |
| Irganox 1010FF [j] | 0.3 | 0.3 |
| Irgafos 168 [j] | 0.3 | 0.3 |
| Geniset D-LM [m] | 0 | 0.3 |
| Total Weight | 120.00 | 120.30 |
| Heat stress test 125° F. | 3P | 3P |
| Heat stress test 130° F. | 1P2F | 3P |

[i] polyethylene wax from Marcus Oil and Chemical
[l] EVA polymers from ExxonMobil
[c] rosin ester from Arizona Chemical
[j] anti-oxidants from Ciba
[m] dibenzylidene sorbitol from RIKA chemical The addition of a dibenzylidene sorbitol as a templating agent in Process B improved the heat stress performance by 5° F.

Example 5

Ar-L1-S-L2-R Templating Agent

Comparative sample 6 (Comp 6) and Samples L-O were prepared by Process A at 350° F.

TABLE 7

Polyolefin based adhesive with Ar-L1-S-L2-R and Polyethylene wax

| | | (% TA) | | | |
|---|---|---|---|---|---|
|  | Comp 6 (0) | Sample L (0.25) | Sample M (0.5) | Sample N (0.25) | Sample O (0.5) |
| Viscowax III V [n] | 24 | 24 | 24 | 24 | 24 |
| AFFINITY GA 1900 [o] | 24 | 24 | 24 | 24 | 24 |
| AFFINITY GA 1950 [p] | 24 | 24 | 24 | 24 | 24 |
| EASTOTAC H-130L [q] | 29.04 | 29.04 | 29.04 | 29.04 | 29.04 |

TABLE 7-continued

Polyolefin based adhesive with Ar-L1-S-L2-R and Polyethylene wax

| (% TA) | Comp 6 (0) | Sample L (0.25) | (% TA) Sample M (0.5) | Sample N (0.25) | Sample O (0.5) |
|---|---|---|---|---|---|
| EASTOTAC H-100W [r] | 18 | 18 | 18 | 18 | 18 |
| ETHANOX310 [s] | 0.72 | 0.72 | 0.72 | 0.72 | 0.72 |
| Irgafos 168 [t] | 0.24 | 0.24 | 0.24 | 0.24 | 0.24 |
| G2 [u] | 0 | 0.3 | 0.6 | | |
| G3 [v] | | | | 0.3 | 0.6 |
| Heat stress at 130° F. | 2P1F | 3P | 3P | 3P | 3P |
| Heat stress at 135° F. | 1P2F | 3P | 3P | 3P | 3P |
| Heat stress at 140° F. | — | 3F | 1P2F | 1P2F | 3P |
| Heat stress at 145° F. | — | — | — | — | 1P2F |

[n] Polyethylene wax from Innospec.
[o] Polyolefin polymers from Dow chemical
[p] Polyolefin polymers from Dow chemical
[q] Tackifier from Eastman chemical company
[r] Tackifier from Albemarle Company
[s] Hindered phenol from Albermarle
[t] Phosphite antioxidants from Ciba-Geigy
[u] Methyl-4,6-O-benzylidene-a-d-galactopyranoside from Carbosynth Limited
[v] Methyl-4,6-O-benzylidene-b-d-galactopyranoside from Carbosynth Limited Example 6

Amide Templating Agents

Samples P-T were prepared by Process A at 350° F.

TABLE 8

Polyolefin based adhesive with Amides and Polyethylene wax

| (% TA) | Comp 6 (0) | Sample P (0.5) | Sample Q (0.5) | Sample R (0.5) | Sample S (0.25) | Sample T (0.5) |
|---|---|---|---|---|---|---|
| Viscowax III V | 24 | 24 | 24 | 24 | 24 | 24 |
| AFFINITY GA 1900 | 24 | 24 | 24 | 24 | 24 | 24 |
| AFFINITY GA 1950 | 24 | 24 | 24 | 24 | 24 | 24 |
| EASTOTAC H-130L | 29.04 | 29.04 | 29.04 | 29.04 | 29.04 | 29.04 |
| EASTOTAC H-100W | 18 | 18 | 18 | 18 | 18 | 18 |
| ETHANOX310 | 0.72 | 0.72 | 0.72 | 0.72 | 0.72 | 0.72 |
| Irgafos 168 | 0.24 | 0.24 | 0.24 | 0.24 | 0.24 | 0.24 |
| Irgaclear XT 386 [w] | 0 | 0.6 | | | | |
| G28 [x] | | | 0.6 | | | |
| G27 [y] | | | | 0.6 | | |
| G17 [z] | | | | | 0.3 | 0.6 |
| NJSTAR NU-100 [aa] | | | | | | |
| Heat stress at 130° F. | 2P1F | 3P | 3P | 3P | 3P | 3P |
| Heat stress at 135° F. | 1P2F | 2P1F | 2P1F | 2P1F | 3P | 2P1F |
| Heat stress at 140° F. | — | 3F | 3F | 3F | 1P2F | 1P2F |

[w] Irgaclear XT-386 is from BASF (structure shown below)

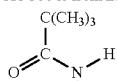

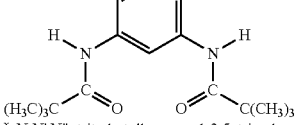

[x] N,N',N'' triterbutylbenzene-1,3,5 tricarboxamide prepared in-house (structure shown below)

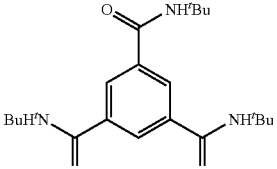

[y] N,N',N'' tri(3-methyl-butyl)benzene-1,3,5 tricarboxamide prepared in-house (structure shown below)

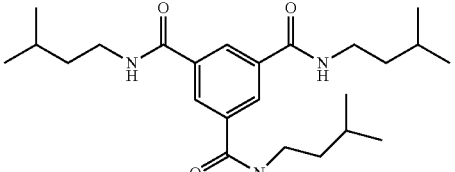

[z] N-[2-(stearionylamino)cyclohexyl]stearic bisamide prepared in-house (structure shown below)

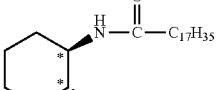

[aa] NJSTART NU-100 from Rika International Limited

Example 7

Ureido-Pyrimidons Templating Agent

Sample U was prepared by Process A at 350° F.

TABLE 9

Polyolefin based adhesive with Ureido-pyrimidone and Polyethylene wax

| (% TA) | Comp 6 (0) | Sample U (0.5) |
|---|---|---|
| Viscowax III V | 24 | 24 |
| AFFINITY GA 1900 | 24 | 24 |
| AFFINITY GA 1950 | 24 | 24 |
| EASTOTAC H-130L | 29.04 | 29.04 |
| EASTOTAC H-100W | 18 | 18 |
| ETHANOX310 | 0.72 | 0.72 |
| Irgafos 168 | 0.24 | 0.24 |

TABLE 9-continued

Polyolefin based adhesive with Ureido-pyrimidone and Polyethylene wax

| (% TA) | Comp 6 (0) | Sample U (0.5) |
|---|---|---|
| SPM1A-C12 [bb] | 0 | 0.6 |
| Heat stress 24 hr | | |
| 130° F. | 2P1F | 3P |
| 135° F. | 1P2F | 3P |
| 140° F. | — | 1P2F |
| DSC evaluation | | |
| ΔH (J/g) | 39.4 | 44.1 |
| Peak(° C.) | 91.7 | 91.9 |

[bb] Ureidopyrimidone from Suprapolix. Due to its low solubility in polyolefin, SPM1A-C12 was prepared in-house as a $C_{12}$ derivative of SPM1A when excess of SPM1A was reacted with $HOC_{12}H_{24}OH$.

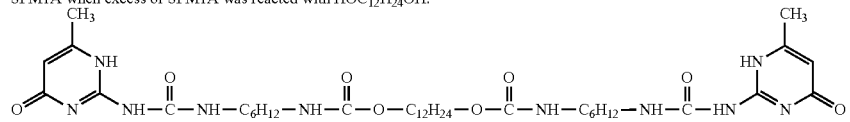

The addition of Ar-L1-S-L2-R, amides and ureido-pyrimidones as templating agents, in adhesives comprising polyethylene wax and polyolefin, improved the heat stress performance of the adhesives by at least 5° F. over the adhesives without any templating agents. The corresponding ΔH values of the adhesives were also increased by at least 5% over the Comparative Sample 6. The average crystalline sizes of samples L-U were increased by at least 10% over the Comparative Sample 6.

We claim:

1. A hot melt adhesive composition comprising:
   a. an ethylene vinyl acetate copolymer or ethylene n-butyl acrylate copolymer;
   b. a wax; and
   c. a templating agent; and
   wherein the copolymer has a melt index greater than 330 grams/10 minutes at 190° C/2.16 kg, measured in accordance with ASTM D1238;
   wherein the templating agent is provided in an effective amount such that the ΔH of the adhesive is increased by at least 5% over the adhesive composition without the templating agent;
   wherein the average crystal size in the adhesive composition is increased by at least 10% over the adhesive composition without the templating agent; and
   wherein the heat resistance of the adhesive is increased by at least 5° F. over the adhesive composition without the templating agent.

2. The adhesive of claim 1, comprising a templating agent in an amount of about 0.01 wt % to less than about 0.5 wt %, based on the total weight of the adhesive.

3. The adhesive of claim 1 wherein the templating agent is a sugar and sugar alcohol derivatives, or has a structure of:

Ar-L1-X-L2-R wherein X is a sugar or a sugar alcohol;
   Ar is a substituted or unsubstituted aryl-containing functional group;
   R is H, alky, alkenyl, hydroxyl, alkoxy and alkyl-halide, or a substituted or unsubstituted aryl-containing functional group; and
   L1 and L2, independently, are acetal or ether functional group.

4. The adhesive of claim 3, wherein the X of the templating agent is selected from the group consisting of allose, altrose, fructose, galactose, glucose, gulose, idose, mannose, sorbose, talose, tagatose, arabinose, ribose, ribulose, xylose, xylulose, lyxose, erythrose, threose sorbitol and xylitol.

5. The adhesive of claim 4 wherein the templating agent is selected from the group consisting of 1,3:2,4 dibenzylidene sorbitol, 1,3:2,4 (4-methyldibenzylidene) sorbitol, bis(3, 4dimethylbenzvlidene) sorbitol and bis(4-propylbenzylidene)propyl sorbitol.

6. The adhesive of claim 1 wherein the templating agent is selected form the group consisting of Li-12 OH stearate, Al stearate, Mg stearate, Ca stearate, 12-hydroxy stearic acid and mixtures thereof.

7. The adhesive of claim 1 wherein the templating agent is selected from the group consisting of phenyl esters, aliphatic amines, perfluoroalkanes, n-alkaneamides, arylamides, mono-amides, di-amides, tris-amides, polyamides, ammonium and phosphonium salts, amino acids, peptides, urea and thiourea, urethanes, ureido-pyrimidones, aminopyrimidones and their corresponding derivatives.

8. The adhesive of claim 1 wherein the wax is a petroleum-based wax, a synthetic wax, a naturally occurring wax or mixtures thereof.

9. The adhesive of claim 8 wherein the wax is a paraffin wax, a polyethylene wax, a polypropylene wax, a Fischer-Tropsch wax or mixtures thereof.

10. The adhesive of claim 1 further comprising a tackifier.

11. The adhesive of claim 10 optionally comprising a stabilizer, a plasticizer, an additive, or mixtures thereof.

12. An article comprising the adhesive of claim 1.

13. The article of claim 12 which is a case, a tray or a carton.

14. A process for forming wax crystals in the adhesive of claim 1 comprising:
   a) heating a first component until molten;
   b) adding a templating agent to the first component until a homogenous first mixture is formed;
   c) adding a second component to the first mixture to form a second mixture; and
   d) cooling the second mixture to room temperature;
   wherein the first and the second components are either the wax or the polymer;
   wherein the first component has a lower crystallization temperature than that of the second component; and
   wherein the second component is the remaining wax or polymer.

15. The process of claim 14 wherein the templating agent is a fatty acid or salt, or has a structure of:

Ar-L1-X-L2-R wherein X is a sugar or a sugar alcohol;
Ar is a substituted or unsubstituted aryl-containing functional group;
R is H, alkys, alkenyls, hydroxyl, alkoxy and alkyl-halides or substituted or unsubstituted aryl-containing functional group; and
L1 and L2, independently, are acetal or ether functional group.

16. The process of claim 14 wherein the fatty acid or salt is selected from the group consisting of Li-12 OH stearate, Al stearate, Mg stearate, Ca stearate and 12-hydroxy stearate.

17. The process of claim 14 wherein the templating agent is selected from phenyl esters, aliphatic amines, perfluoroalkanes, n-alkaneamides, ammonium and phosphonium salts, amino acids, peptides, urea and thiourea, urethanes and corresponding derivatives and mixtures thereof.

18. A process for forming wax crystals in the adhesive of claim 1 further comprising a tackifier, wherein the process comprises:
e) heating a first component until molten;
f) adding a templating agent to the first component until a homogenous first mixture is formed;
g) adding a second component to the first mixture to form a second mixture; and
h) adding a third component to the second mixture to form a third mixture; and
i) cooling the third mixture to room temperature;
wherein the first, the second and the third components are either the wax, the tackifier or the polymer;
wherein the templating agent has the highest solubility in the first component than that of the second and third components;
wherein the second component has a lower crystallization temperature than that of the third component; and
wherein the third component is the remaining wax, tackifier or polymer.

19. A process for forming wax crystals in the adhesive of claim 1 further comprising a tackifier, wherein the process comprises:
a) heating a first component until molten;
b) adding a templating agent to the first component until a homogenous first mixture is formed;
c) adding a second component to the first mixture to form a second mixture; and
d) adding a third component to the second mixture to form a third mixture; and
e) cooling the third mixture to room temperature;
wherein the first, the second and the third components are either the wax, the tackifier or the polymer;
wherein the first component has the lowest melting temperature than that of the second and third components;
wherein the second component has a lower crystallization temperature than that of the third component; and
wherein the third component is the remaining wax, tackifier or polymer.

20. A hot melt adhesive composition comprising:
a. an ethylene vinyl acetate, ethylene n-butyl acrylate, ethylene-butene, ethylene-propylene, ethylene-hexene or ethylene-octene copolymer;
b. a wax; and
c. from about 0.01 wt % to less than about 0.5 wt %, a templating agent selected from the group consisting of fatty acid, fatty acid salt, n-alkeneamides, arylamides, mono polyamide, polydiamides, polytriamides, ureidopyrimidone or aminopyrimidone;
wherein the ΔH of the adhesive is increased by at least 5% over an adhesive composition without the templating agent;
wherein the average crystal size in the adhesive is increased by at least 10% over the adhesive composition without the templating agent; and
wherein the heat resistance of the adhesive is increased by at least 5° F. over an adhesive composition without the templating agent.

\* \* \* \* \*